(12) United States Patent
Shin

(10) Patent No.: US 6,774,978 B2
(45) Date of Patent: Aug. 10, 2004

(54) DEVICE FOR CUTTING LIQUID CRYSTAL DISPLAY PANEL AND METHOD FOR CUTTING USING THE SAME

(75) Inventor: Sang-Sun Shin, Kyongsangbuk-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 47 days.

(21) Appl. No.: 10/126,698

(22) Filed: Apr. 22, 2002

(65) Prior Publication Data

US 2003/0151717 A1 Aug. 14, 2003

(30) Foreign Application Priority Data

Feb. 9, 2002 (KR) ........................................ P2002-7774

(51) Int. Cl.⁷ ............................................... G02F 1/13
(52) U.S. Cl. ...................... 349/187; 349/158; 225/96.5; 83/885
(58) Field of Search ................................ 349/158, 187; 225/96.5; 83/885

(56) References Cited

U.S. PATENT DOCUMENTS

| | | |
|---|---|---|
| 3,978,580 A | 9/1976 | Leupp et al. |
| 4,094,058 A | 6/1978 | Yasutake et al. .......... 29/592 R |
| 4,653,864 A | 3/1987 | Baron et al. |
| 4,691,995 A | 9/1987 | Yamazaki et al. ...... 350/331 R |
| 4,775,225 A | 10/1988 | Tsuboyama et al. |
| 5,247,377 A | 9/1993 | Omeis et al. .................. 359/76 |
| 5,263,888 A | 11/1993 | Ishihara et al. |
| 5,379,139 A | 1/1995 | Sato et al. |
| 5,406,989 A | 4/1995 | Abe |
| 5,499,128 A | 3/1996 | Hasegawa et al. |
| 5,507,323 A | 4/1996 | Abe |
| 5,511,591 A | 4/1996 | Abe ................................ 141/7 |
| 5,539,545 A | 7/1996 | Shimizu et al. |
| 5,548,429 A | 8/1996 | Tsujita |
| 5,642,214 A | 6/1997 | Ishii et al. ..................... 349/96 |
| 5,680,189 A | 10/1997 | Shimizu et al. |
| 5,742,370 A | 4/1998 | Kim et al. ................... 349/124 |
| 5,757,451 A | 5/1998 | Miyazaki et al. |
| 5,852,484 A | 12/1998 | Inoue et al. |
| 5,854,664 A | 12/1998 | Inoue et al. |
| 5,861,932 A | 1/1999 | Inata et al. |
| 5,875,922 A | 3/1999 | Chastine et al. ................ 222/1 |
| 5,952,676 A | 9/1999 | Sato et al. |
| 5,956,112 A | 9/1999 | Fujimori et al. |
| 6,001,203 A | 12/1999 | Yamada et al. |
| 6,010,384 A * | 1/2000 | Nishino et al. ................ 445/24 |
| 6,011,607 A * | 1/2000 | Yamazaki et al. .......... 349/153 |
| 6,011,609 A | 1/2000 | Kato et al. ................... 349/190 |
| 6,016,178 A | 1/2000 | Kataoka et al. ............. 349/117 |
| 6,016,181 A | 1/2000 | Shimada |
| 6,055,035 A | 4/2000 | Von Gutfeld et al. ........ 349/187 |
| 6,163,357 A | 12/2000 | Nakamura ................... 349/155 |
| 6,195,149 B1 * | 2/2001 | Kodera et al. .............. 349/187 |
| 6,219,126 B1 | 4/2001 | Von Gutfeld |
| 6,226,067 B1 | 5/2001 | Nishiguchi et al. .......... 349/155 |

(List continued on next page.)

FOREIGN PATENT DOCUMENTS

| | | |
|---|---|---|
| EP | 1 003 066 A1 | 5/2000 |
| JP | 51-65656 | 6/1976 |

(List continued on next page.)

Primary Examiner—Dung T. Nguyen
Assistant Examiner—Andrew Schechter
(74) Attorney, Agent, or Firm—Morgan, Lewis & Bockius LLP

(57) ABSTRACT

A device for cutting a liquid crystal display panel includes a first scribing unit for forming a first scribing line at first and second mother substrates by using first and second wheels and pressing at least a portion of the first scribing line with a first roll, a second scribing unit for forming a second scribing line at the first and second mother substrates by using third and fourth wheels and pressing at least a portion of the second scribing line with a second roll, and a first rotating unit for rotating the first and second mother substrates to form the second scribing line.

26 Claims, 19 Drawing Sheets

U.S. PATENT DOCUMENTS

| | | | |
|---|---|---|---|
| 6,236,445 B1 | 5/2001 | Foschaar et al. | |
| 6,304,306 B1 | 10/2001 | Shiomi et al. | 349/88 |
| 6,304,311 B1 | 10/2001 | Egami et al. | 349/189 |
| 6,337,730 B1 | 1/2002 | Ozaki et al. | |
| 6,414,733 B1 | 7/2002 | Ishikawa et al. | 349/110 |
| 6,470,782 B1 * | 10/2002 | Shimotoyodome et al. | 83/879 |
| 2001/0021000 A1 | 9/2001 | Egami | 349/187 |

FOREIGN PATENT DOCUMENTS

| | | |
|---|---|---|
| JP | 52-149725 | 12/1977 |
| JP | 57-38414 | 3/1982 |
| JP | 57-88428 | 6/1982 |
| JP | 58-27126 | 2/1983 |
| JP | 59-057221 | 4/1984 |
| JP | 59-195222 | 11/1984 |
| JP | 60-111221 | 6/1985 |
| JP | 60-1648723 | 8/1985 |
| JP | 60-217343 | 10/1985 |
| JP | 61-7822 | 1/1986 |
| JP | 61-55625 | 3/1986 |
| JP | 62-89025 | 4/1987 |
| JP | 62-90622 | 4/1987 |
| JP | 62-205319 | 9/1987 |
| JP | 63-109413 | 5/1988 |
| JP | 63-110425 | 5/1988 |
| JP | 63-128315 | 5/1988 |
| JP | 63-311233 | 12/1988 |
| JP | 5-127179 | 5/1993 |
| JP | 5-154923 A | 6/1993 |
| JP | 5-265011 | 10/1993 |
| JP | 5-281557 | 10/1993 |
| JP | 5-281562 | 10/1993 |
| JP | 6-51256 | 2/1994 |
| JP | 6-148657 | 5/1994 |
| JP | 6-160871 | 6/1994 |
| JP | 6-235925 A | 8/1994 |
| JP | 6-265915 | 9/1994 |
| JP | 6-313870 A | 11/1994 |
| JP | 7-84268 A | 3/1995 |
| JP | 7-128674 | 5/1995 |
| JP | 7-181507 | 7/1995 |
| JP | 8-95066 | 4/1996 |
| JP | 8-101395 A | 4/1996 |
| JP | 8-106101 | 4/1996 |
| JP | 8-171094 | 7/1996 |
| JP | 8-190099 | 7/1996 |
| JP | 8-240807 | 9/1996 |
| JP | 9-5762 | 1/1997 |
| JP | 9-26578 | 1/1997 |
| JP | 9-61829 A | 3/1997 |
| JP | 9-73075 | 3/1997 |
| JP | 9-73096 | 3/1997 |
| JP | 9-127528 | 5/1997 |
| JP | 9-230357 | 9/1997 |
| JP | 9-281511 | 10/1997 |
| JP | 9-311340 | 12/1997 |
| JP | 10-123537 | 5/1998 |
| JP | 10-123538 | 5/1998 |
| JP | 10-142616 | 5/1998 |
| JP | 10-177178 A | 6/1998 |
| JP | 10-221700 | 8/1998 |
| JP | 10-282512 | 10/1998 |
| JP | 10-333159 A | 12/1998 |
| JP | 11-14953 | 1/1999 |
| JP | 11-38424 | 2/1999 |
| JP | 11-64811 | 3/1999 |
| JP | 11-109388 | 4/1999 |
| JP | 11-133438 A | 5/1999 |
| JP | 11-142864 A | 5/1999 |
| JP | 11-174477 | 7/1999 |
| JP | 11-212045 | 8/1999 |
| JP | 11-248930 A | 9/1999 |
| JP | 11-326922 A | 11/1999 |
| JP | 10-333157 A | 12/1999 |
| JP | 11-344714 | 12/1999 |
| JP | 2000-2879 A | 1/2000 |
| JP | 2000-29035 | 1/2000 |
| JP | 2000-56311 A | 2/2000 |
| JP | 2000-66165 A | 3/2000 |
| JP | 2000-137235 A | 5/2000 |
| JP | 2000-147528 A | 5/2000 |
| JP | 2000-193988 A | 7/2000 |
| JP | 2000-241824 A | 9/2000 |
| JP | 2000-284295 A | 10/2000 |
| JP | 2000-292799 A | 10/2000 |
| JP | 2000-310759 A | 11/2000 |
| JP | 2000-310784 A | 11/2000 |
| JP | 2000-338501 A | 12/2000 |
| JP | 2001-5401 A | 1/2001 |
| JP | 2001-5405 A | 1/2001 |
| JP | 2001-13506 A | 1/2001 |
| JP | 2001-33793 A | 2/2001 |
| JP | 2001-42341 A | 2/2001 |
| JP | 2001-51284 A | 2/2001 |
| JP | 2001-66615 A | 3/2001 |
| JP | 2001-91727 A | 4/2001 |
| JP | 2001-117105 | 4/2001 |
| JP | 2001-117109 A | 4/2001 |
| JP | 2001-133745 A | 5/2001 |
| JP | 2001-133794 | 5/2001 |
| JP | 2001-133799 A | 5/2001 |
| JP | 2001-142074 | 5/2001 |
| JP | 2001-147437 | 5/2001 |
| JP | 2001-154211 | 6/2001 |
| JP | 2001-166272 A | 6/2001 |
| JP | 2001-166310 A | 6/2001 |
| JP | 2001-183683 A | 7/2001 |
| JP | 2001-201750 A | 7/2001 |
| JP | 2001-209052 A | 8/2001 |
| JP | 2001-209060 A | 8/2001 |
| JP | 2001-215459 A | 8/2001 |
| JP | 2001-222017 A | 8/2001 |
| JP | 2001-235758 A | 8/2001 |
| JP | 2001-255542 | 9/2001 |
| JP | 2001-264782 | 9/2001 |
| JP | 2001-272640 A | 10/2001 |
| JP | 2001-281675 A | 10/2001 |
| JP | 2001-281678 A | 10/2001 |
| JP | 2001-282126 A | 10/2001 |
| JP | 2001-305563 A | 10/2001 |
| JP | 2001-330837 A | 11/2001 |
| JP | 2001-330840 | 11/2001 |
| JP | 2001-356353 A | 12/2001 |
| JP | 2001-356354 | 12/2001 |
| JP | 2002-14360 | 1/2002 |
| JP | 2002-23176 | 1/2002 |
| JP | 2002-49045 | 2/2002 |
| JP | 2002-82340 | 3/2002 |
| JP | 2002-90759 | 3/2002 |
| JP | 2002-90760 | 3/2002 |
| JP | 2002-107740 | 4/2002 |
| JP | 2002-122872 | 4/2002 |
| JP | 2002-122873 | 4/2002 |
| JP | 2002-139734 | 5/2002 |
| JP | 2002-202512 | 7/2002 |
| JP | 2002-202514 | 7/2002 |
| JP | 2002-214626 | 7/2002 |
| KR | 2000-0035302 A | 6/2000 |

* cited by examiner

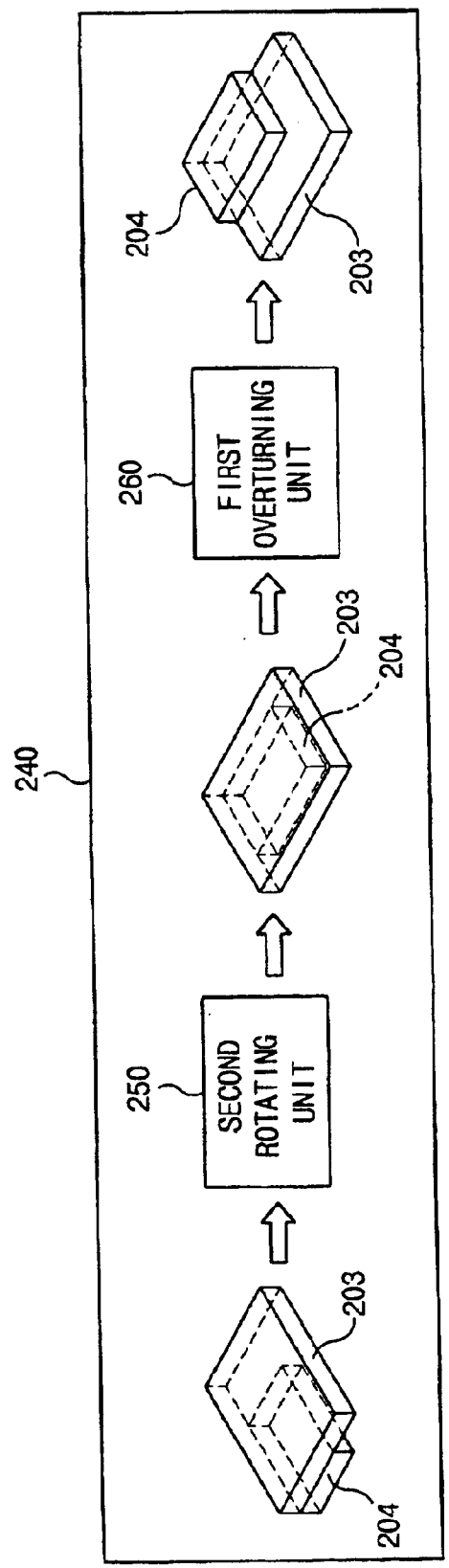

DEVICE FOR CUTTING LIQUID CRYSTAL DISPLAY PANEL AND METHOD FOR CUTTING USING THE SAME

This application claims the benefit of the Korean Patent Application No. P2002-07774 filed on Feb. 9, 2002, which is hereby incorporated by reference.

BACKGROUND OF THE INVENTION

1. Field of the Invention

The present invention relates to a liquid crystal display panel, and more particularly, to a device for cutting a liquid crystal display panel and a method for cutting using the same to separate a unit liquid crystal display panel from the mother substrate.

2. Discussion of the Related Art

In general, a liquid crystal display device displays a desired picture by individually supplying a data signal according to picture information to the liquid crystal cell arranged in a matrix form and controlling light transmittance of the liquid crystal cells.

The liquid crystal display device includes a liquid crystal display panel on which liquid crystal cells of a pixel unit are arranged in a matrix form, and a driver integrated circuit (IC) for driving the liquid crystal cells.

The liquid crystal display panel includes a color filter substrate and a thin film transistor array substrate that are facing into each other and a liquid crystal filled between the color filter substrate and the thin film transistor array substrate.

On the thin film transistor array substrate of the liquid crystal display panel, there are a plurality of data lines for transmitting a data signal supplied from a data driver integrated circuit to the liquid crystal cell and a plurality of gate lines for transmitting a scan signal supplied from a gate driver integrated circuit to the liquid crystal cells. The liquid crystal cells are defined at each portion where the data lines and the gate lines cross each other.

The gate driver integrated circuit sequentially supplies a scan signal to the plurality of gate lines so that the liquid crystal cells arranged in a matrix form are sequentially selected line by line. A data signal is supplied from the data driver integrated circuit to the selected line of the liquid crystal cells.

Meanwhile, a common electrode and a pixel electrode are formed the color filter substrate and the thin film transistor array substrate to face into each other for applying an electric field to the liquid crystal layer.

The pixel electrode is formed by liquid crystal cells on the thin film transistor array substrate, while the common electrode is integrally formed on the entire surface of the color filter substrate.

Accordingly, by controlling a voltage applied to the pixel electrode while a voltage is applied to the common electrode, the light transmittance of the liquid crystal cells is individually controlled.

In order to control the voltage applied to the pixel electrode by each liquid crystal cell, a thin film transistor used as a switching device is formed at each liquid crystal cell.

To improve yield in fabricating a liquid crystal display device, a plurality of thin film transistor array substrates are formed on one large mother substrate, and a plurality of color filter substrates are formed on the other mother substrate. The two mother substrates are the attached to simultaneously form the plurality of liquid crystal display panels. Thus, a process for cutting the liquid crystal display panel into a plurality of unit panels is required.

Cutting the liquid crystal display panel is performed by a scribing process for forming a scribing line on the surface of the mother substrate with a pen made of diamond having a hardness higher than that of glass and a breaking process for cutting by applying a mechanical force along the scribing line.

The cutting process will now be described in detail with reference to the accompanying drawings.

FIG. 1 is a schematic plane view showing a unit liquid crystal display panel formed with a thin film transistor array substrate 1 and a color filter substrate 2 attached to face into each other.

In FIG. 1, the liquid crystal display panel 10 includes a picture display unit 13 having a plurality of liquid crystal cells arranged in a matrix form, a gate pad unit 14 connected to a plurality of gate lines of the picture display unit 13, and a data pad unit 15 connected to the gate pad unit 14 and a plurality of data lines.

The gate pad unit 14 and the data pad unit 15 are formed at the marginal portion of the thin film transistor array substrate 1. The portion does not overlap the color filter substrate 2.

The gate pad unit 14 supplies a scan signal supplied from the gate driver integrated circuit to the gate lines of the picture display unit 13. The data pad unit 15 supplies picture information supplied from the data driver integrated circuit to the data lines of the picture display unit 13.

The data lines receiving the picture information and the gate lines receiving the scan signal are disposed to be crossed orthogonally on the thin film transistor array substrate 1 of the picture display unit 13. At the crossed portion, a thin film transistor is formed for switching the liquid crystal cells, and a pixel electrode is formed to be connected to the thin film transistor for driving the liquid crystal cell. Further, a protective film is formed at the entire surface to protect the electrode and the thin film transistor.

At the color filter substrate 2 of the picture display unit 13, a plurality of color filters are coated to be separated by cell regions with a black matrix, and a common transparent electrode to the pixel electrode are formed at the thin film transistor array substrate 1.

A cell gap is formed between the thin film transistor array substrate 1 and the color filter substrate 2 so that the two substrates are spaced apart and face into each other. The thin film transistor array substrate 1 and the color filter substrate 2 are attached by a sealant (not shown) formed at the exterior of the picture display unit 13. A liquid crystal layer (not shown) is formed at the space between the thin film transistor array substrate 1 and the color filter substrate 2.

FIG. 2 is a cross-sectional view showing a plurality of unit liquid crystal display panels formed in the first mother substrate having the thin film transistor array substrates 1 and the second mother substrate with the color filter substrate 2.

As shown in FIG. 2, a plurality of unit panels are formed in such a manner that one side of the thin film transistor array substrate 1 is protruded as much as a dummy region 31.

This is because the gate pad unit 14 and the data pad unit 15 are formed at the marginal portion where the thin film transistor array substrate 1 and the color filter substrate 2 do not overlap.

Thus, the color filter substrate 2 formed on the second mother substrate 30 is formed to be isolated as much as dummy regions 31 corresponding to the area that the thin film transistor array substrates 1 formed on the first mother substrate 20 are protruded.

Each unit panel is disposed at the first and second mother substrates 20 and 30 so that the first and the second mother substrates 20 and 30 are used at the maximum. Depending on a model, the unit liquid crystal display panels are generally formed to be isolated as much as the dummy region 32.

After the first mother substrate 20 where the thin film transistor array substrates 1 are formed and the second mother substrate 30, where the color filter substrates 2 are formed, are attached each other, the liquid crystal display panels are individually cut through the scribing process and the breaking process. The dummy regions 31 formed at the region where the color filter substrates 2 of the second mother substrate 30 are isolated. The dummy region 32 isolating the unit panels are simultaneously removed.

The cutting process to the unit panels will now be described with reference to FIGS. 3A to 3J.

As shown in FIG. 3A, the first mother substrate 20 and the second mother substrate 30 are loaded on a first table 33.

Next, as shown in FIG. 3B, the first table 33 is moved in one direction to sequentially form a plurality of first scribing lines 42 on the first mother substrate 20 with a cutting wheel 41.

After first and second mother substrates 20 and 30 in FIG. 3C are rotated by 90°, the first table 33 is moved to its original position to sequentially form a plurality of second scribing lines 43 on the surface of the first mother substrate 20 through the cutting wheel 41.

FIG. 3D illustrates the first and second mother substrates 20 and 30, which are overturned and loaded on a second table 34. While the second table 34 is moved in one direction, the second mother substrate 30 is pressed by a breaking bar 44 along the second scribing lines 43 so that a crack is transmitted on the first mother substrate 20.

Next, as shown in FIG. 3E, second and first mother substrates 30 and 20 are rotated by 90°. While the second table 34 is moved to its original position, the second mother substrate 30 is pressed by the breaking bar 44 along the first scribing lines 42, so that a crack is transmitted on the first mother substrate 20.

As shown in FIG. 3F, the second and first substrates 30 and 20 are loaded on a third table 35. A plurality of third scribing lines 46 are sequentially formed on the surface of the second mother substrate 30 with a cutting wheel 45 by moving the third table 35 in one direction.

Thereafter, the second and first mother substrates 30 and 20 are rotated by 90°, as shown in FIG. 3G. A plurality fourth scribing lines 47 are sequentially formed on the surface of the second mother substrate 30 with the cutting wheel 45 by moving the third table 35 to its original position.

As shown in FIG. 3H, second and first mother substrates 30 and 20 are overturned and loaded on the fourth table 36. The first mother substrate 20 is pressed by a breaking bar 48 along the fourth scribing line 47 by moving the fourth table 36 in one direction, so that a crack is transmitted on the second mother substrate 30.

Next, the first and second mother substrates 20 and 30 are rotated by 90°, as shown in FIG. 3I. The first mother substrate 20 is pressed by the breaking bar 48 along the third scribing line 46 by moving the fourth table 36 to its original position, so that a crack is transmitted on the second mother substrate 30.

As shown in FIG. 3J, as the crack is transmitted on first and second mother substrates 20 and 30 along first through fourth scribing lines 42, 43, 46, and 47, unit panels are selectively unloaded by using a vacuum gripper 49 and conveyed to the equipment for next processes.

As mentioned above, in the conventional cutting device and cutting processes for the unit panel, scribing is performed four times and breaking is performed four times through four rotation processes and two overturning processes.

Thus, two scribing units including a rotating unit and two breaking units including a rotating unit and an overturning unit are required. These equipments would occupy much space in the working place. Thus, an installation expense and a space of the equipment are wasted.

In addition, much time is required for the scribing and breaking processes, resulting in a low productivity.

SUMMARY OF THE INVENTION

Accordingly, the present invention is directed to a device for cutting a liquid crystal display panel and a method for cutting using the same that substantially obviates one or more of problems due to limitations and disadvantages of the related art.

Another object of the present invention is to provide a device for cutting a liquid crystal display panel and a method for cutting using the same that is capable of minimizing the number of rotations and overturnings for cutting the unit panels from the mother substrate.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a device for cutting a liquid crystal display panel includes a first scribing unit for forming a first scribing line at first and second mother substrates by using first and pressing at least a portion of the first scribing line with a first roll, a second scribing unit for forming a second scribing line at the first and second mother substrates by using third and fourth wheels and pressing at least a portion of the second scribing line with a second roll, and a first rotating unit for rotating the first and second mother substrates to form the second scribing line.

In another aspect of the present invention, a device for cutting a liquid crystal display panel includes a first scribing unit for loading and holding first and second mother substrates between the first and second tables, forming a first scribing line on the first and second mother substrates with first and second wheels, and cutting the first and second mother substrates by moving the first and second tables, a first rotating unit for rotating the first and second mother substrates by 90°, and a second scribing unit for loading and holding the first and second mother substrates between the third and fourth tables, forming a second scribing line on first and second mother substrates with the third and fourth wheels to cut the first and second mother substrates by moving the third and fourth tables.

In another aspect of the present invention, a method for cutting a liquid crystal display panel includes forming a first scribing line at first and second mother substrates, pressing at least a portion of the first scribing line with a first roll to cut the first and second mother substrates, forming a second scribing line at the first and second mother substrates, and pressing at least a portion of the second scribing line with a second roll to cut the first and second mother substrates.

In a further aspect of the present invention, a method for cutting a liquid crystal display panel includes loading and holding first and second mother substrates between the first and second tables, forming a first scribing line at first and second mother substrates, cutting the first and second mother substrates by moving the first and second tables, loading and holding the first and second mother substrates between the third and fourth tables, forming a second scribing line at the first and second mother substrates, and cutting the first and second mother substrates by moving the third and fourth tables.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

In the drawings:

FIGS. 7A to 7G illustrate sequential processes for performing each block of FIG. 6;

DETAILED DESCRIPTION OF THE ILLUSTRATED EMBODIMENTS

Reference will now be made in detail to the illustrated embodiments of the present invention, examples of which are illustrated in the accompanying drawings. Wherever possible, the same reference numbers will be used throughout the drawings to refer to the same or like parts.

Figure 4:
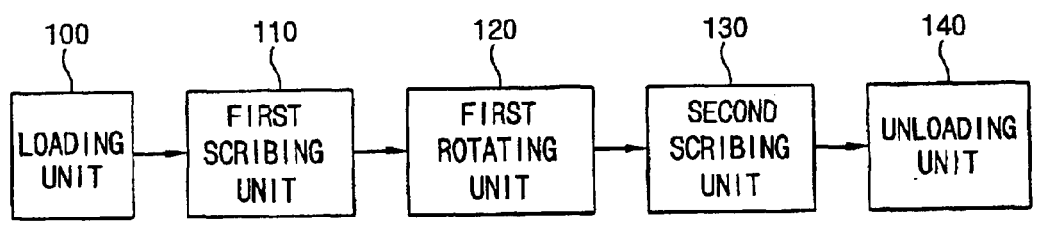
FIG. 4 is a schematic block diagram of a device for cutting a liquid crystal display panel in accordance with a first embodiment of the present invention.

FIG. 4 is a schematic block diagram of a device for cutting a liquid crystal display panel in accordance with a first embodiment of the present invention.

As shown in FIG. 4, the device for cutting a liquid crystal display panel includes a loading unit 100 for loading and aligning first and second mother substrates including a plurality of unit liquid crystal display panels thereon. A first scribing unit 110 is to form a first scribing line on the surface of the first and second mother substrates with a first upper wheel and a first lower wheel, and to press at least a portion of the first scribing line with a first roll in order to sequentially cut the first and second mother substrates. A first rotating unit 120 is to rotate the cut first and second mother substrates by 90°. A second scribing unit 130 is to form a second scribing line on the surface of the rotated first and second mother substrates with a second upper wheel and a second lower wheel and to press at least a portion of the second scribing line in order to sequentially cut the first and second mother substrates. An unloading unit 140 is to unload the unit liquid crystal display panels cut by the first and second scribing units 110 and 130 and to convey to the equipment for the following processes.

FIGS. 5A to 5G illustrate sequential processes for performing each block of FIG. 4.

Figure 5A:
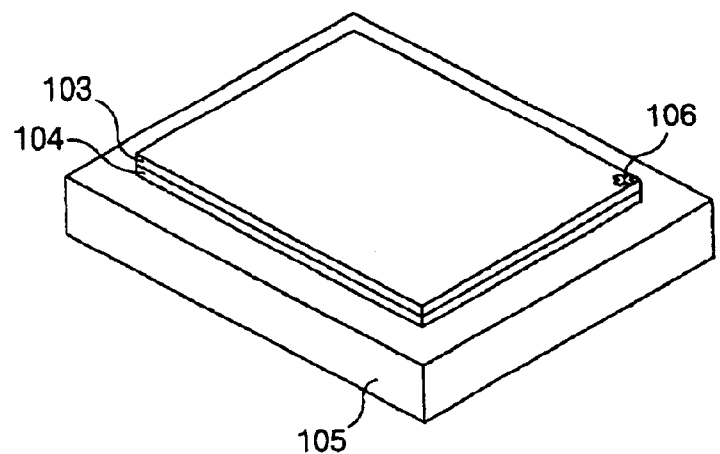
FIGS. 5A to 5G illustrate sequential processes in each block of FIG. 4.

Initially referring to FIG. 5A, a loading unit 100 loads a first mother substrate 103 and a second mother substrate 104 that are attached to each other placed on a first table 105. The first mother substrate includes a plurality of thin film transistor array substrates formed thereon, and the second mother substrate includes a plurality of color filter substrates formed thereon. The first and second mother substrates 103 and 104 are aligned through an alignment mark 106.

When the first and second mother substrates 103 and 104 are loaded on the first table 105, the first mother substrate 103 is stacked to be on the second mother substrate 104. An impact to the thin film transistor array substrate or the color filter substrate in a cutting process of the first and second mother substrates 103 and 104 may be mitigated by this location.

Figure 5B:
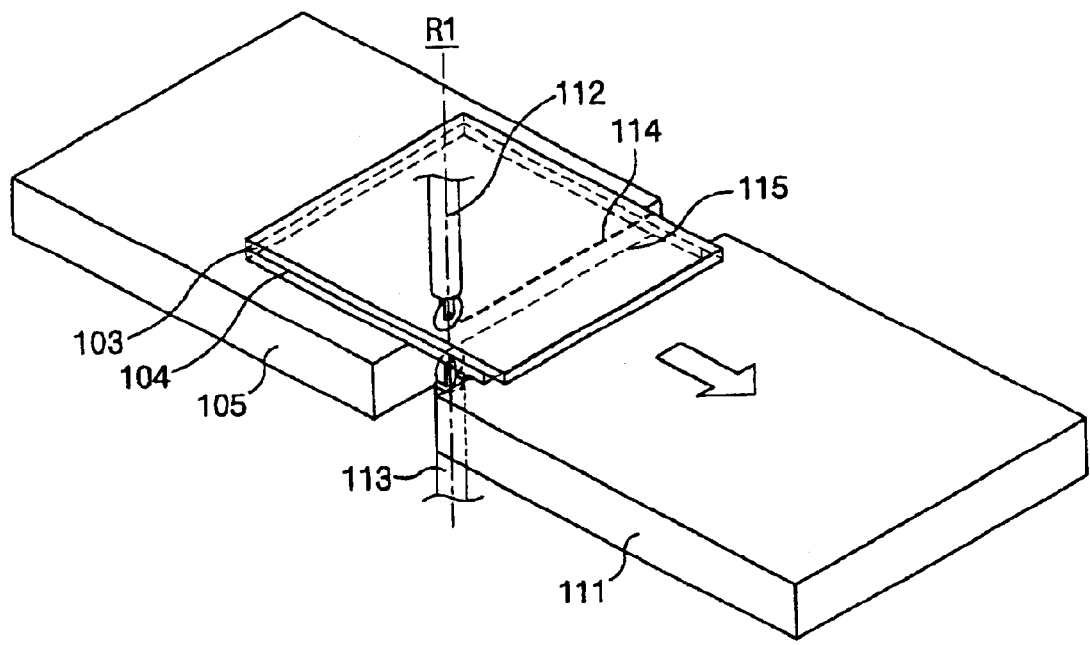

As shown in FIG. 5B, the first scribing unit 110 sequentially forms first scribing lines 114 and 115 at the surface of the first and second mother substrates 103 and 104 through the first upper wheel 112 and the first lower wheel 113 located at the space between the first and second tables 105 and 111. In this process, the first and second mother substrates 103 and 104 move to be placed between the first table 105 and the second table 111.

One side of the thin film transistor array substrates formed at the first mother substrate 103 is protruded to be longer than the corresponding side of the color filter substrates formed at the second mother substrate 104.

Figure 1:
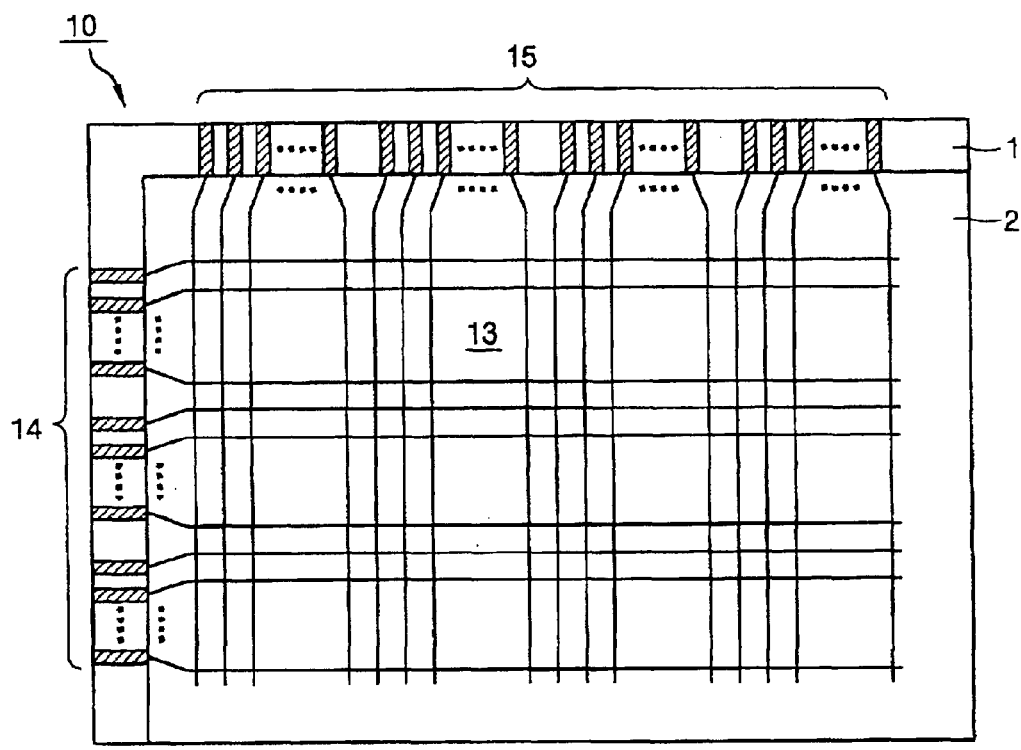
FIG. 1 is a plane view showing a unit liquid crystal display panel formed in the thin film transistor array substrate and a color filter substrate for a liquid crystal display device, which are attached to face into each other in a facing manner.
Figure 2:
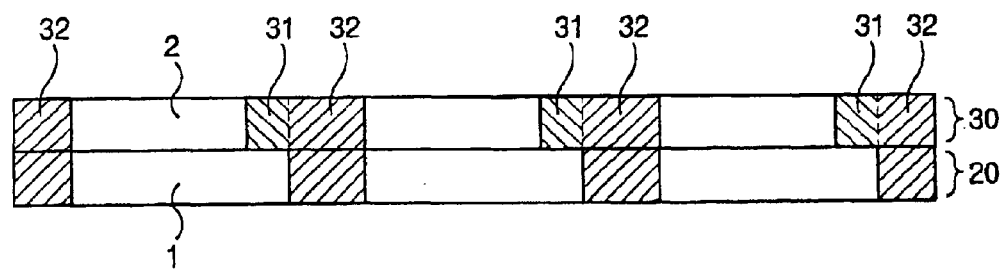
FIG. 2 is a cross-sectional view showing a plurality of liquid crystal display panels formed in the first mother substrate including the thin film transistor array substrates and the second mother substrate with the color filter substrate of FIG. 1.
Figure 3A:
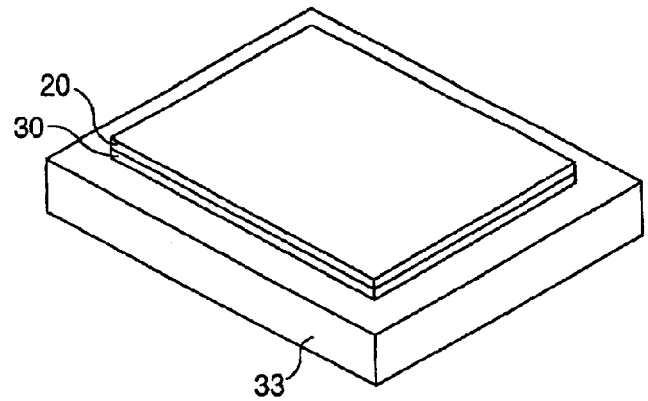
FIGS. 3A to 3J illustrate sequential cutting processes of unit panels in accordance with a related art.
Figure 3B:
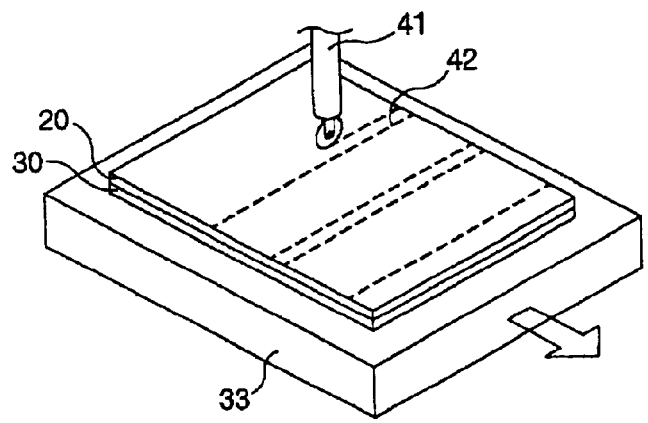
Figure 3C:
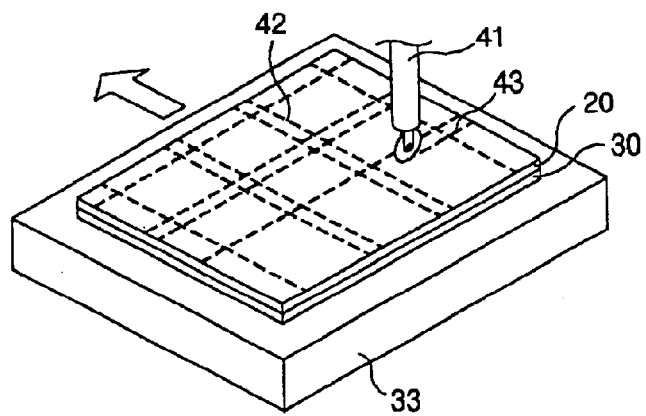
Figure 3D:
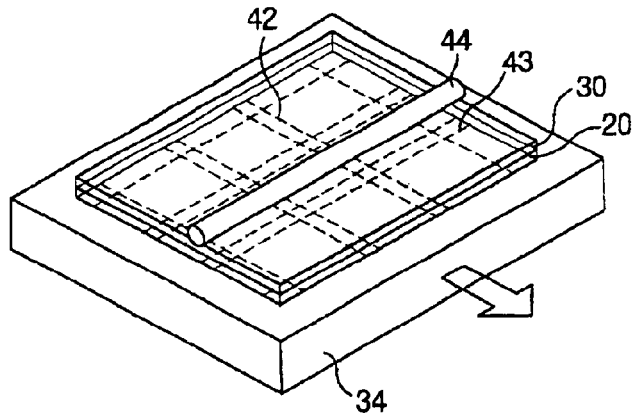
Figure 3E:
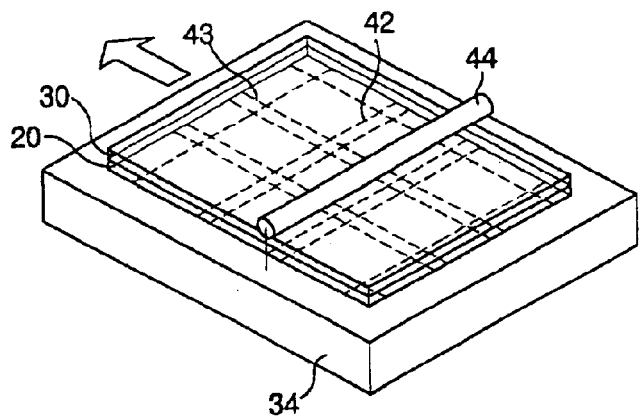
Figure 3F:
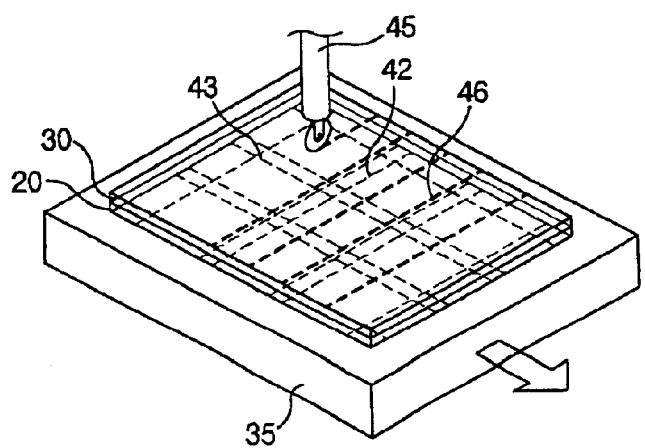
Figure 3G:
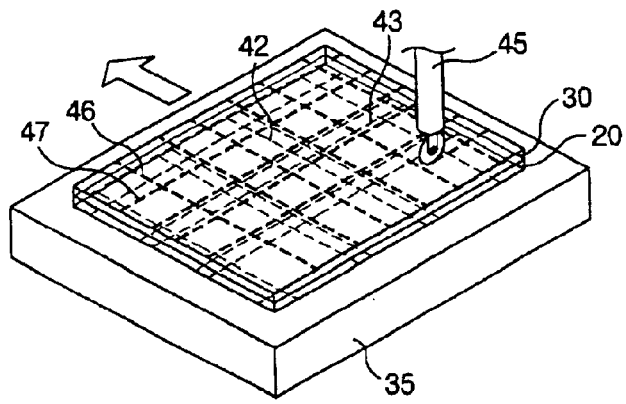
Figure 3H:
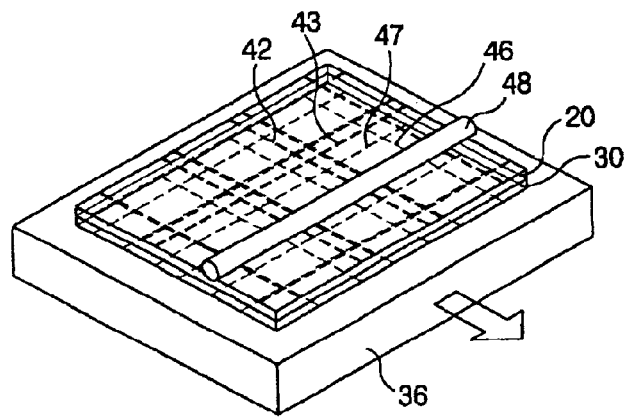
Figure 3I:
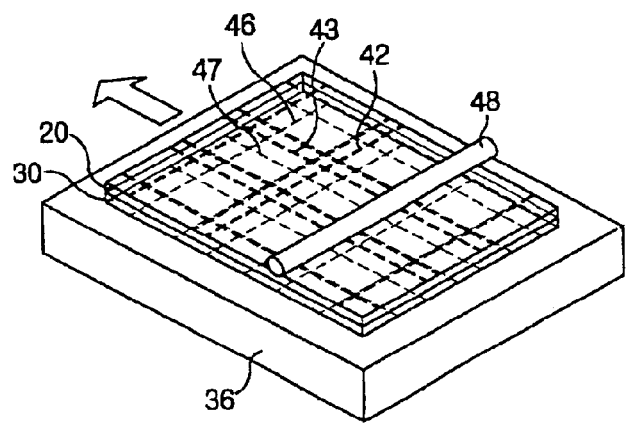
Figure 3J:
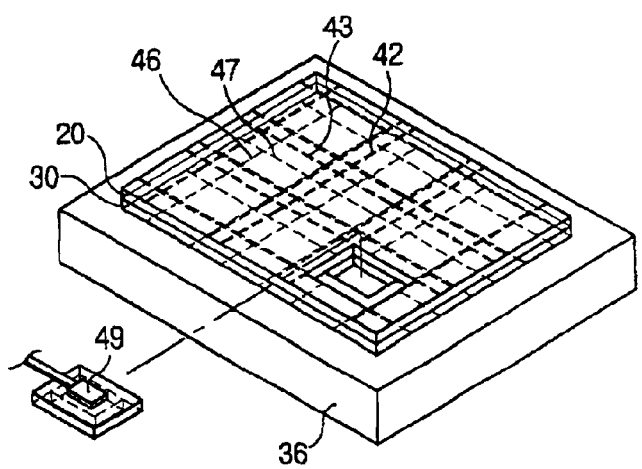

This is because the gate pad unit is formed at one of the horizontal sides and the data pad unit is formed at one of the vertical sides of the thin film transistor array substrate, as described above with reference to FIGS. 1 and 2.

Accordingly, at the protruded region of the thin film transistor array substrates longer than the corresponding side of the color filter substrates, the first scribing line 114 is formed at the surface of the first mother substrate 103 distanced from a reference line (R1) by using the first upper wheel 112. The first scribing line 115 is formed at the surface of the second mother substrate 104 distanced from the reference line (R1) in the opposite direction corresponding to the first upper wheel 112 by using the first lower wheel 113.

Meanwhile, at the region where a gate pad unit or the data pad unit of the thin film transistor array substrates are not formed, the first upper wheel 112 and the first lower wheel 113 are aligned to form the first scribing lines 114 and 115 at the surfaces of the first and second mother substrates 103 and 104.

Figure 5C:
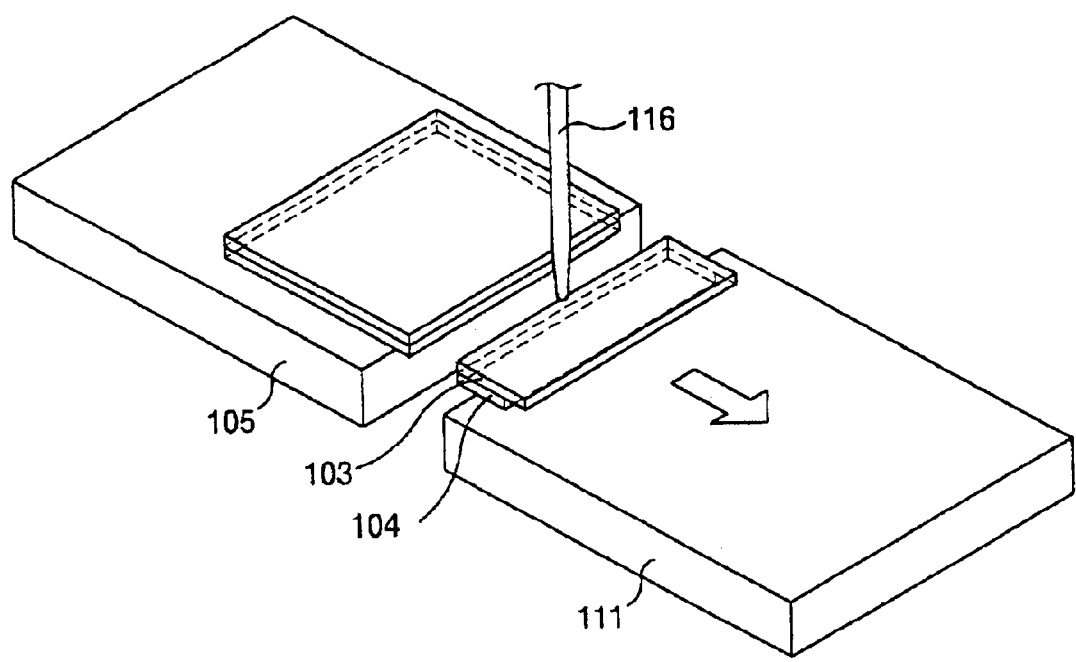

The first scribing unit 110 presses a portion of the first scribing lines 114 and 115 with the first roll 116 to sequentially cut the first and second mother substrates 103 and 104, as shown in FIG. 5C.

The first roll 116 presses a portion or several portions of the first scribing line 114 formed by the first upper wheel 112. Thus, a crack is transmitted along the first scribing lines 114 and 115 on the first and second mother substrates 103 and 104.

The first upper wheel 112 forms the first scribing line 114 at the surface of the first mother substrate 103 and is moved to the original position. The first roll 116 works with the first wheel 112 in motion, so that it may be applied along the first scribing line 114.

The first roll 116 may be applied only to the first scribing line 115 formed at the surface of the second mother substrate 104. Alternatively, it may be applied both to the first scribing lines 114 and 115 formed at the surfaces of the first and second mother substrates 103 and 104.

The first roll 116 may be made of urethane so that it may be less slippery on a glass substrate when the first roll 116 is applied. The first roll 116 directly contacts the first mother substrate 103 having the thin film transistor array substrate formed thereon. Also, a urethane material has an excellent characteristic in static electricity and generates less amount of particles upon contacting with the substrate.

Figure 5D:
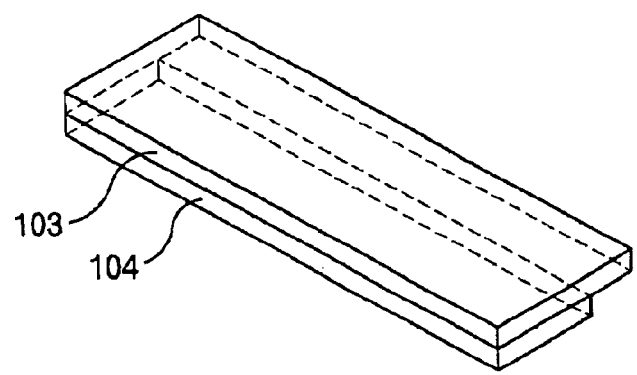

As shown in FIG. 5D, the first rotating unit 120 rotates the first and second mother substrates 103 and 104 by 90°.

Figure 5E:
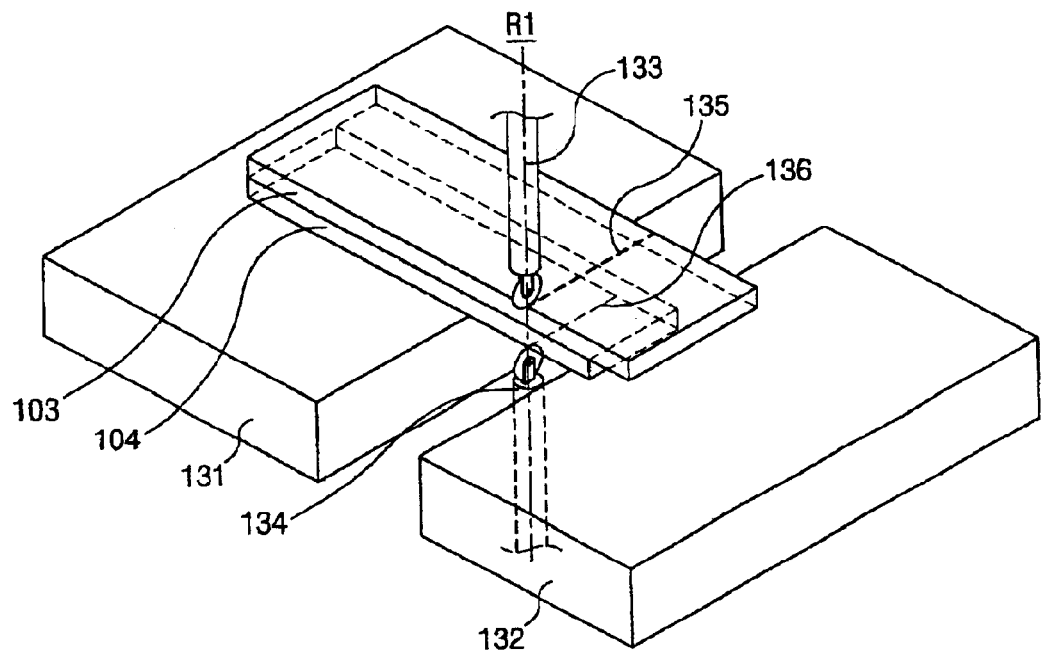

In FIG. 5E, the second scribing unit 130 sequentially forms second scribing lines 135 and 136 at the surfaces of the first and second mother substrates 103 and 104 with a second upper wheel 133 and a second lower wheel 134 located at the space between the third and fourth tables 131 and 132. In this process, the rotated first and second mother substrates 103 and 104 move to be positioned between third and fourth tables 131 and 132.

In the same manner with the first upper wheel 112 and the first lower wheel 113, as described above with reference to FIG. 5B, the second upper wheel 133 and the second lower wheel 134 form the second scribing lines 135 and 136 at the surfaces of the first and second mother substrates 103 and 104. They are isolated with each other for a certain distance in the opposite direction from the reference line R1 at the region where one side of the thin film transistor array substrates is protruded to be longer than the corresponding side of the color filter substrates.

Meanwhile, at the region where the thin film transistor array substrates are not protruded to be longer than the color filter substrates, the second upper wheel 133 and the second lower wheel 134 are aligned to form the second scribing lines 135 and 136 at the surfaces of the first and second mother substrates 103 and 104.

Figure 5F:
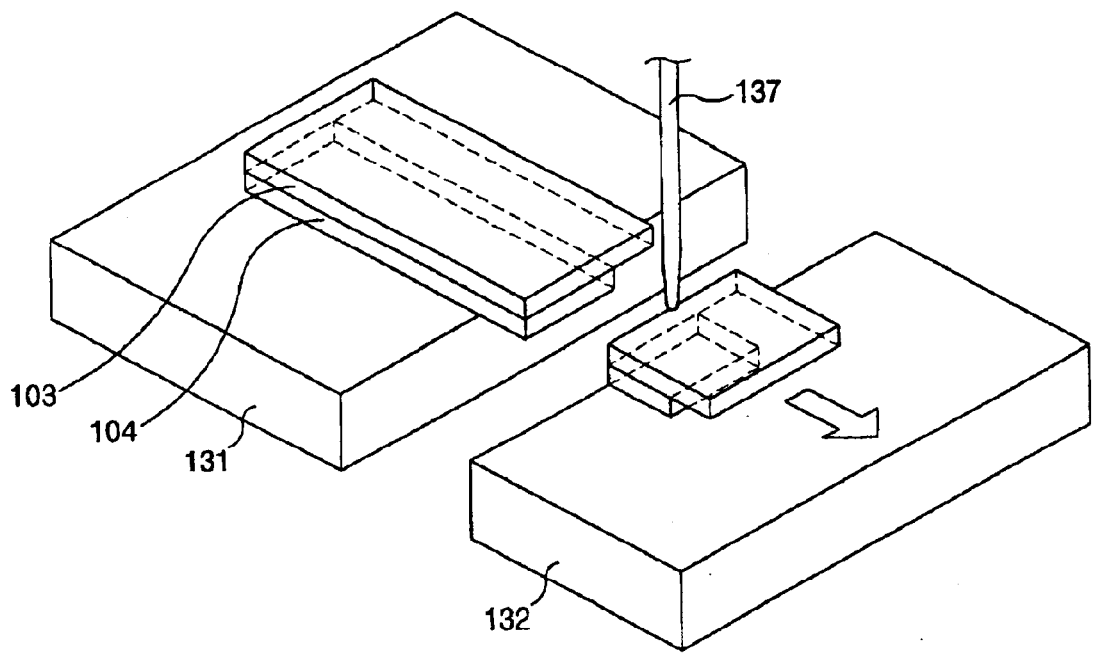

As shown in FIG. 5F, the second scribing unit 130 presses a portion of the second scribing lines 135 and 136 with a second roll 137 to sequentially cut out the first and second mother substrates 103 and 104.

In the same manner with the second roll 137 and the first roll 116 as described above with reference to FIG. 5C, one portion or several portions of the second scribing line 135 formed by the second upper wheel 133 is simultaneously pressed, so that a crack is transmitted along the second scribing lines 135 and 136 on the first and second mother substrates 103 and 104.

In this respect, after the second upper wheels 133 forms second scribing line 135 at the surface of the first mother substrate 103, the second roll 137 is moved to the original position while it presses along the second scribing line 135 by working with the second upper wheel 133. Thus, the second scribing line 135 is more effectively pressed.

The second roll 137 may be made of urethane since it has a little frictional force with a glass substrate and thus has an excellent characteristic in static electricity. Moreover, it generates a little amount of particles upon contacting with the glass substrate.

Figure 5G:
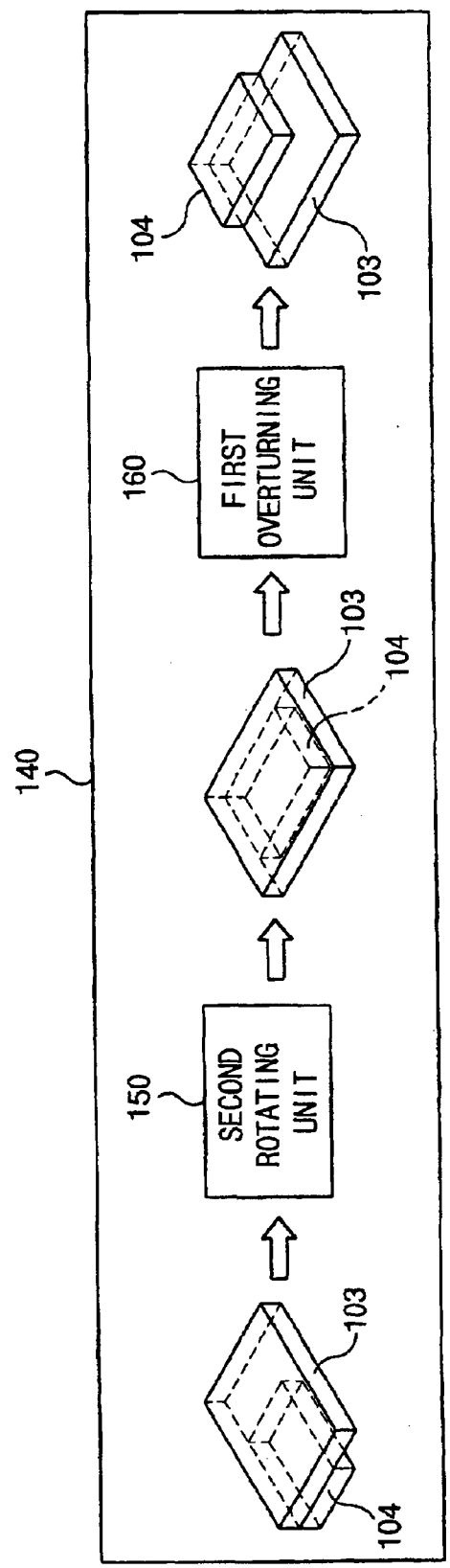

As shown in FIG. 5G, the unloading unit 140 conveys the unit liquid crystal display panels sequentially cut along the first and second scribing lines 114, 115, 135, and 136 to the equipment for the following processes.

The sequentially cut unit panels is rotated by 90° compared to the direction of the loading unit 100. Thus, as shown in FIG. 5G, the unit panels are rotated by 90° by inserting the second rotating unit 150 into the unloading unit 140 and unloaded to the equipment for the following processes. Thus, the present invention facilitates the following processes.

In addition, when the color filter substrate should be stacked on the thin film transistor array substrate in the following processes, as shown in FIG. 5G, after the unloaded unit panels are overturned by inserting the first overturning unit 160 into the unloading unit 140, they are conveyed to the equipment for the following processes.

As mentioned above, according to the device for cutting a liquid crystal display panel and the method for cutting using the same of the present invention, the first and second mother substrates are cut into the unit panels in such a manner that at least one portion of the first and second scribing lines is pressed with the first and second rolls while the first and second scribing lines are formed through one rotation process, and two simultaneous scribing processes of the first and second mother substrates.

Meanwhile, the thin film transistor array substrate and the color filter substrate attached to each other are fabricated to be separated apart on the first and second mother substrates. A dummy seal pattern may be formed at the exterior of the first and second mother substrates where unit panels are not formed, so as to prevent a distortion of the attached first and second mother substrates depending on the model of the liquid crystal display device.

However, when the first and second mother substrates having a dummy seal pattern is cut by using the first embodiment of the present invention, the first and second mother substrates may not be easily separated from each other.

Figure 6:
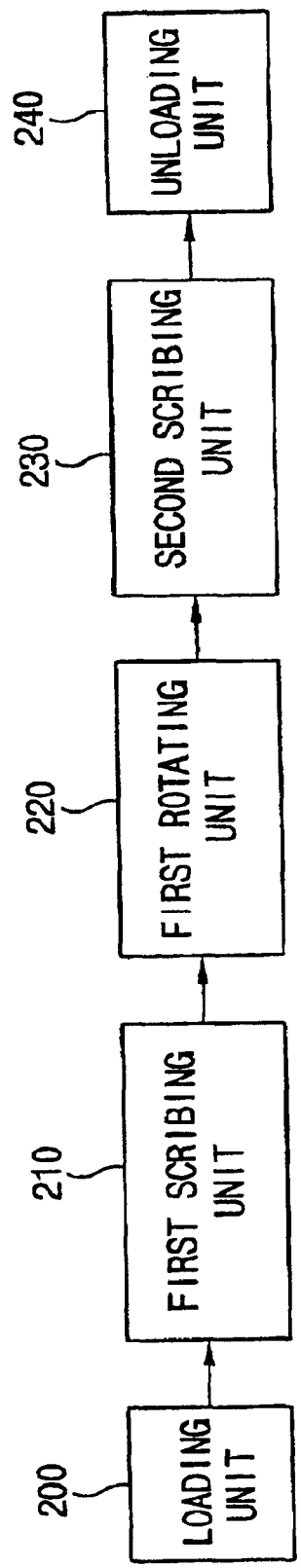
FIG. 6 is a schematic block diagram of a device for cutting a liquid crystal display panel in accordance with a second embodiment of the present invention.

FIG. 6 is a schematic block diagram of a device for cutting a liquid crystal display panel to effectively cut and separate first and second mother substrates having a dummy seal pattern in accordance with a second embodiment of the present invention.

As shown in FIG. 6, the device of a liquid crystal display panel in accordance with the second embodiment of the present invention includes a loading unit 200 for loading and aligning first and second mother substrates where a plurality of unit liquid crystal display panels are formed thereon. The first and second mother substrates are placed on the first table. A first scribing unit 210 is to load and hold the first and second mother substrates by vacuum suction so that it is placed on both the first table and the second table that are spaced apart by a certain distance. A first scribing line is formed at the surface of the first and second mother substrates with the first upper wheel and the first lower wheel. The first and second mother substrates are sequentially cut by moving the first and second tables in the direction so that they become distant from each other. A first rotating unit 220 is to rotate the cut first and second mother substrates by 90°. A second scribing unit 230 is to load and hold the rotated first and second mother substrates by vacuum suction to be bridged between the third and fourth tables that are spaced apart by a certain distance. The second scribing line is formed at the surface of the first and second mother substrates with the second upper wheel and the second lower wheels. The first and second mother substrates are sequentially cut by moving the third and fourth tables in a direction that they become distant from each other. An unloading unit 240 is to unload the unit liquid crystal display panel cut and separated by the first and second scribing units 210 and 230 and to convey to the equipment for the following processes.

FIGS. 7A to 7G illustrate sequential processes for performing each block of FIG. 6.

Figure 7A:
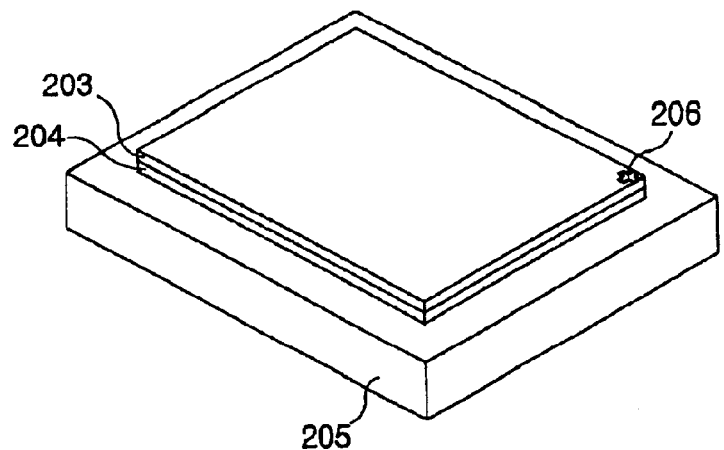

Initially referring to FIG. 7A, the loading unit 200 loads the first mother substrate 203 and the second mother substrate 204 that are attached to each other. The first mother substrate includes a plurality of thin film transistor array substrates formed thereon and the second mother substrate includes a plurality of color filter substrates formed thereon. They are placed on a first table 205 and aligned through an alignment mark 206.

If the first and second mother substrates 203 and 204 are stacked on the second mother substrate 204, an impact caused in the cutting process to the thin film transistor array substrate or the color filter substrate may be mitigated.

Figure 7B:
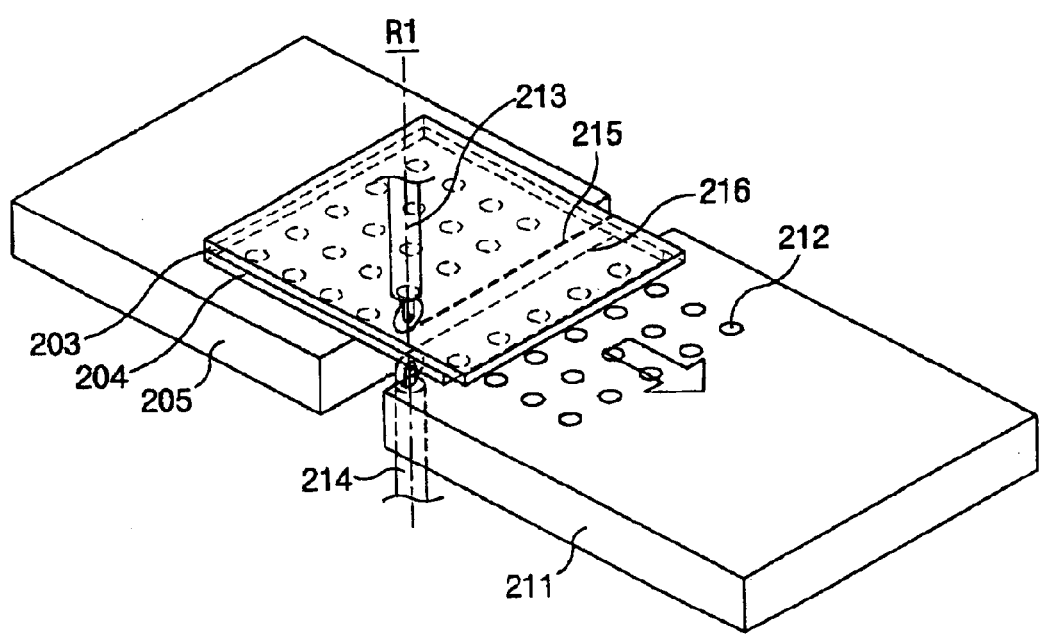

As shown in FIG. 7B, the first scribing unit 210 loads the first and second mother substrates 203 and 204, so as to be bridged between the first table 205 and the second table 211 that are spaced apart from each other. The first scribing unit 210 also holds the substrates 203 and 204 through a plurality of vacuum suction holes 212, and sequentially forms the first scribing lines 215 and 216 at the surfaces of the first and second substrates 203 and 204 through the first upper wheel 213 and the first lower wheel 214 located at the space between the first and the second tables 205 and 211.

One side of the thin film transistor array substrates formed at the first mother substrate 203 is protruded to be longer than to the corresponding side of the color filter substrates formed on the second mother substrate 204.

This is because the gate pad unit is formed at one of the horizontal sides and the data pad unit is formed at one of the vertical sides of the thin film transistor array substrate, as described above with reference to FIGS. 1 and 2.

Accordingly, at the protruded region of the thin film transistor array substrates, the first scribing line 215 is formed at the surface of the first mother substrate 203 distanced from one side of a reference line (R1) by using the first upper wheel 213. The first scribing line 215 is formed at the surface of the second mother substrate 204 distanced from the reference line (R1) in the opposite direction corresponding to the first upper wheel 213 by using the first lower wheel 214.

Meanwhile, at the region where a gate pad unit or the data pad unit of the thin film transistor array substrates are not formed, the first upper wheel 213 and the first lower wheel 214 are aligned to each other, so as to form the first scribing lines 215 and 216 at the surfaces of the first and second mother substrates 203 and 204.

Figure 7C:
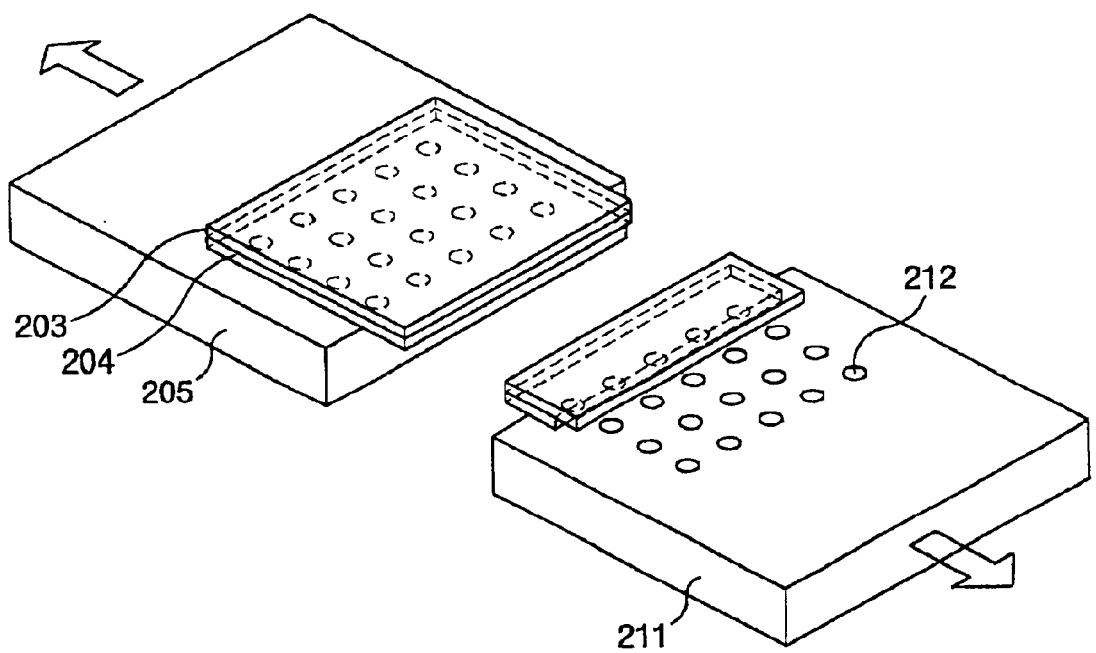

In FIG. 7C, the first scribing unit 210 moves the first and second tables 205 and 211 on which the first and second mother substrates 203 and 204 are held by the a plurality of vacuum suction holes 212 in a direction that they become distant from each other. Thereafter, the first and the second mother substrates 203 and 204 are cut and separated along the first scribing lines 215 and 216.

The vacuum suction holes 212 may be formed to be separated at constant intervals at the surfaces of the first and second tables 205 and 211. The first and second mother substrates 203 and 204 are held onto the first and second tables 205 and 211 by sucking air and released from the first and second tables 205 and 211 by injecting air when the first and second mother substrates are conveyed to the next process.

Figure 8:
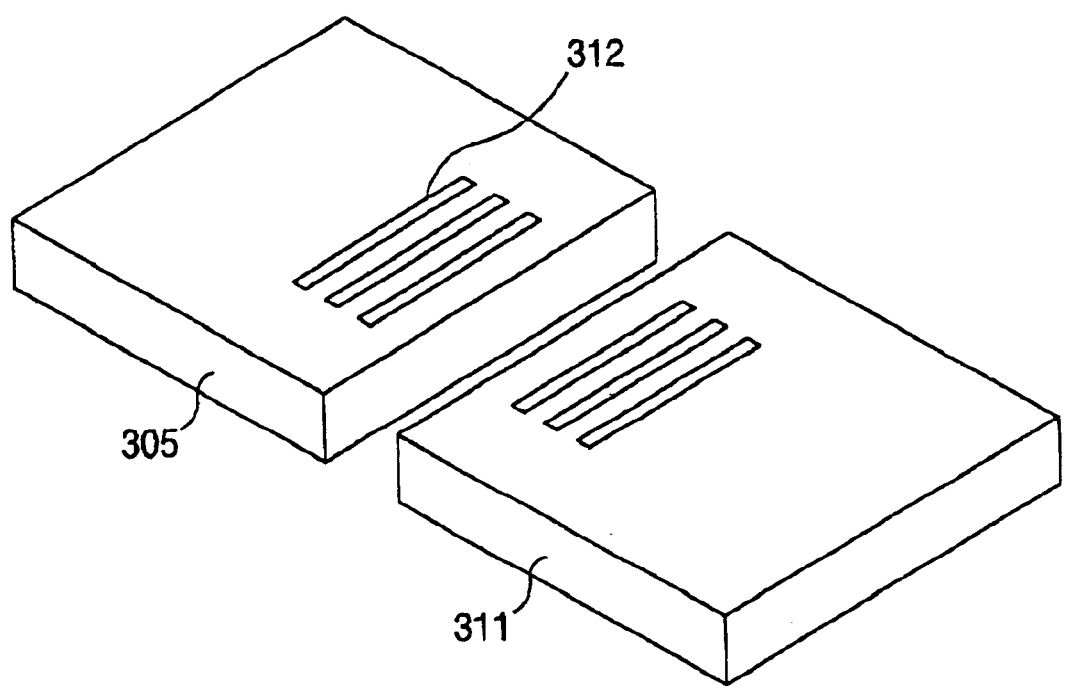
FIG. 8 is a schematic view showing a plurality of vacuum suction holes formed at the first through the fourth tables of FIGS. 7A to 7G.

Meanwhile, as shown in FIG. 8, the vacuum suction holes 212 may be formed as the vacuum suction unit 312 having a certain area at the surface of the first and second tables 305 and 311, thereby effectively holding the first and second mother substrates 203 and 204. If a suction pressure is too high, a black dot stain may occur at the first and the second mother substrates 203 and 204. This problem may be prevented by using the vacuum suction unit 321.

Figure 7D:
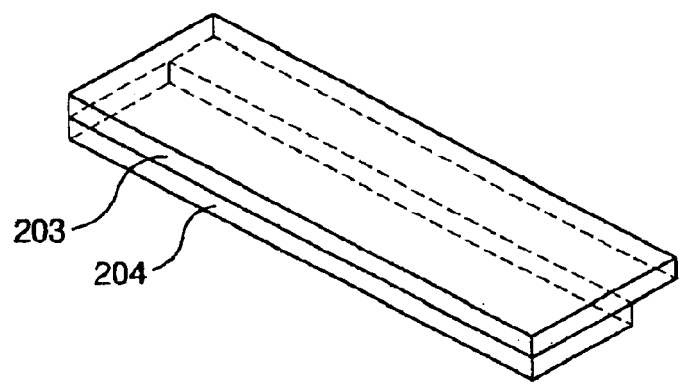

The first rotating unit 220 rotates the cut first and second mother substrates 203 and 204 by 90°, as shown in FIG. 7D.

Figure 7E:
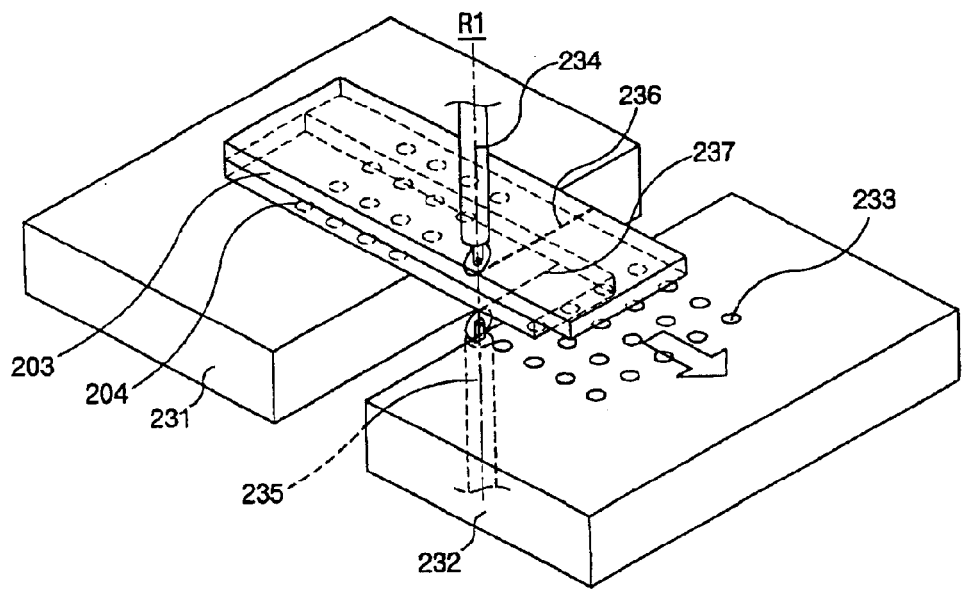

The second scribing unit 230, in FIG. 7E, loads the rotated first and second mother substrates 203 and 204, so as to be bridged between the third and fourth tables 231 and 232 that are spaced apart by a certain distance. The first and second mother substrates 203 and 204 are held by the vacuum suction holes 233. The second scribing lines 236 and 237 are sequentially formed at the surface of the first and second mother substrates 203 and 204 through the second upper wheel 234 and the second lower wheel 235 located at the space between the third and fourth tables 231 and 232.

In the same manner with the first upper wheel 213 and the first lower wheel 214 as described above with reference to FIG. 7B, the second upper wheel 234 and the second lower wheel 235 form the second scribing lines 236 and 237 at the surfaces of the first and second mother substrates 203 and 204, so as to be isolated to each other by a certain distance in the opposite direction from the reference line R1, at the region where one side of the thin film transistor array substrates is protruded to be longer than the corresponding side of the color filter substrates.

Meanwhile, at the region where the thin film transistor array substrates are not protruded to be longer than the color filter substrates, the second upper wheel 234 and the second lower wheel 235 are aligned to each other, so as to form the second scribing lines 236 and 237 at the surface of the first and second mother substrates 203 and 204.

Figure 7F:
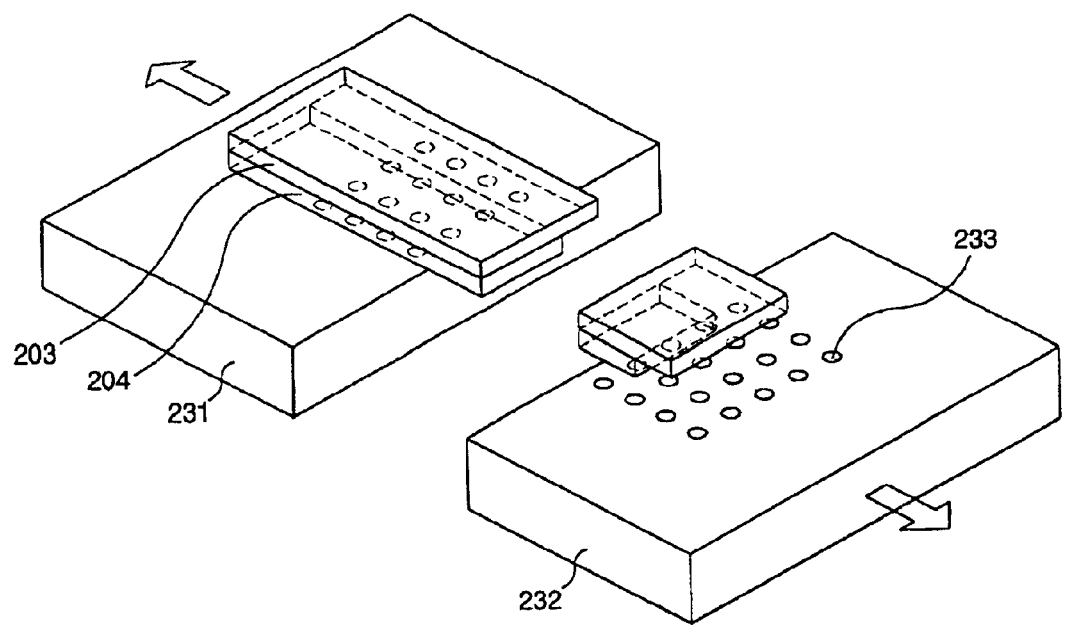

As shown in FIG. 7F, the second scribing unit 230 moves the third and fourth tables 231 and 232 on which the first and second mother substrates 203 and 204 are held by the vacuum suction holes 233 in a direction that they become distance from each other. The first and second mother substrates 203 and 204 are cut and separated from each other along the second scribing lines 236 and 237.

The vacuum suction holes 233 formed at the surface of the third and fourth tables 231 and 232 are the same as the vacuum suction holes 212 formed at the surface of the aforementioned first and second tables 205 and 211. The vacuum suction holes 233 may have a different shape, such as the vacuum suction holes 312 having a rectangular shape, as illustrated in FIG. 8.

In FIG. 7G, the unloading unit 240 conveys the unit liquid crystal display panels that are sequentially cut along the first and second scribing lines 215, 216, 236, and 237 to the equipment for the following processes.

The sequentially cut unit panels are rotated by 90° compared to the direction of the loading unit 200. Thus, as shown in FIG. 7G, the unit panels are rotated by 90° by inserting the second rotating unit 250 into the unloading unit 240 and unloaded to the equipment for the following processes for facilitating the following processes.

If the color filter substrate should be stacked on the thin film transistor array substrate for the following processes, as shown in FIG. 7G, after the unloaded unit panels are overturned by inserting the first overturning unit 260 into the unloading unit 240, they may be conveyed to the equipment for the following processes.

As mentioned above, according to the cutter for cutting a liquid crystal display panel and the method for cutting using the same of the present invention, the first and second mother substrates are cut into the unit liquid crystal display panels in such a manner that the first and second tables or the third and fourth tables, on which the loaded and held first and the second mother substrates, are moved in the direction that they become distant from each other, while the first and second scribing lines are formed through one rotation process, and two simultaneous scribing processes of the first and second mother substrates.

The first and second scribing processes respectively include cutting and removing a dummy region where the unit panels are not formed from the first and second mother substrates and cutting the region where the unit panels from the first and second mother substrates, which are alternately performed.

Figure 9A:
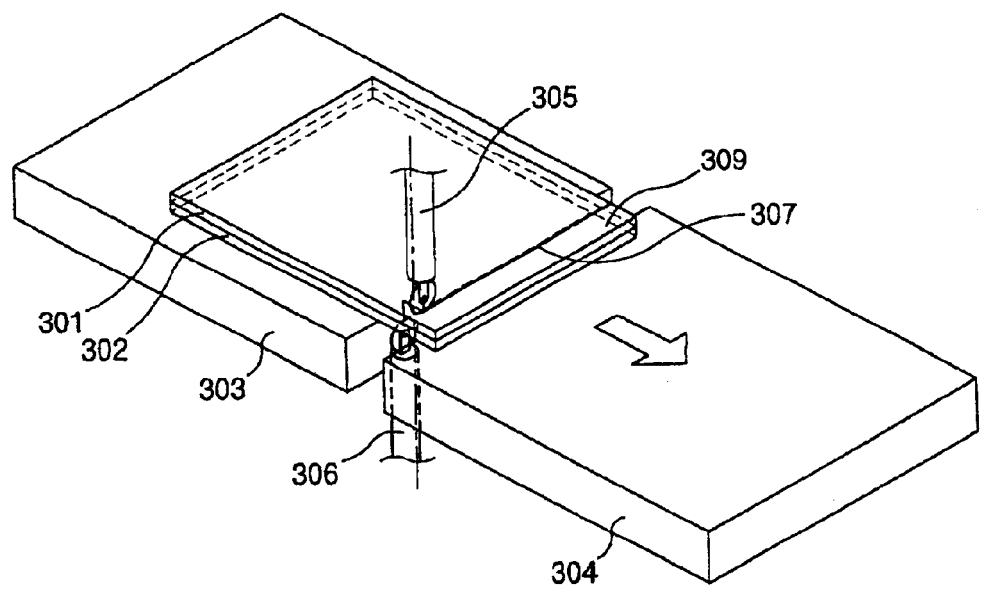
FIGS. 9A and 9B illustrate first and second scribing processes for cutting a liquid crystal display panel in the present invention.

That is, as shown in FIG. 9A, after the first and second mother substrates 301 and 302 are moved to be bridged between the first and second tables 303 and 304 that are spaced apart by a certain distance, the first scribing line 307 is formed with the first upper wheel 305 and the first lower wheel 306. And then, similar to the first embodiment of the present invention, at least one portion of the first scribing line 307 is pressed with the roll. Alternatively, similar to the second embodiment of the present invention, the first and second tables 303 and 304 on which the held first and second mother substrates 301 and 302 are moved in a direction that they become distant from each other. Then, the dummy region 309 at one side where the unit liquid crystal display panels are not formed is cut out from the first and second mother substrates 301 and 302.

Figure 9B:
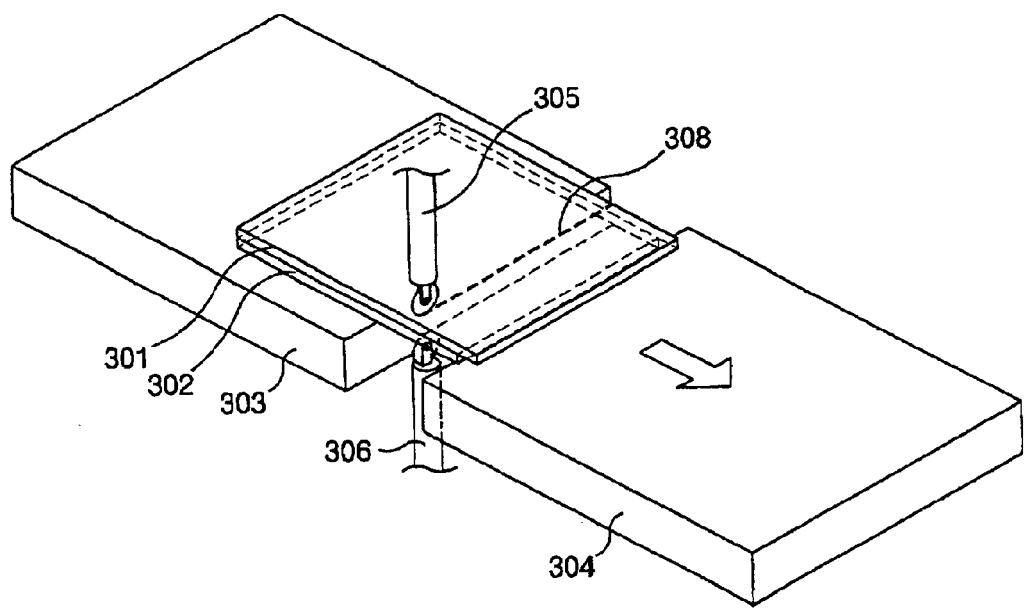

As shown in FIG. 9B, the first and second mother substrates 301 and 302 without the dummy region 309 as being removed in the first cutting process are moved in one direction, so as to be bridged between the first and second tables 303 and 304. And then, the second scribing line 308 is formed with the first upper wheel 305 and the first lower wheel 306, and at least one portion of the first scribing line 308 is pressed with the roll, similar to the first embodiment of the present invention. Alternatively, the first and second tables 303 and 304 holding the first and second mother substrates 301 and 302 are moved in the opposite direction so that the unit panels are cut out from the first and second mother substrates 301 and 302.

Thereafter, the first cutting process is performed to cut out the dummy region 309 where no unit panel is formed from the first and second mother substrates 301 and 302. The second cutting process is performed to cut out the unit panels from the first and second mother substrates 301 and 302. The first and second cutting processes may be repeatedly performed.

In this respect, however, when the cutting processes are performed on the model having the dummy seal pattern to prevent distortion of the first and second mother substrates 301 and 302 at the exterior where no unit panel is formed, the dummy region 309 and the unit panels may not be completely separated in the first or second cutting process.

In addition, in the second cutting process in the second embodiment of the present invention, a unit panel is large enough to cut out the first and second mother substrates 301 and 302 held on the first and second tables 303 and 304. However, in the first cutting process, since the dummy region 309 is very narrow, it is difficult to hold the first and second mother substrates 301 and 302 by the first and second tables 303 and 304.

FIGS. 10A to 10F illustrate sequential processes for cutting a liquid crystal display panel in accordance with a third embodiment of the present invention.

Figure 10A:
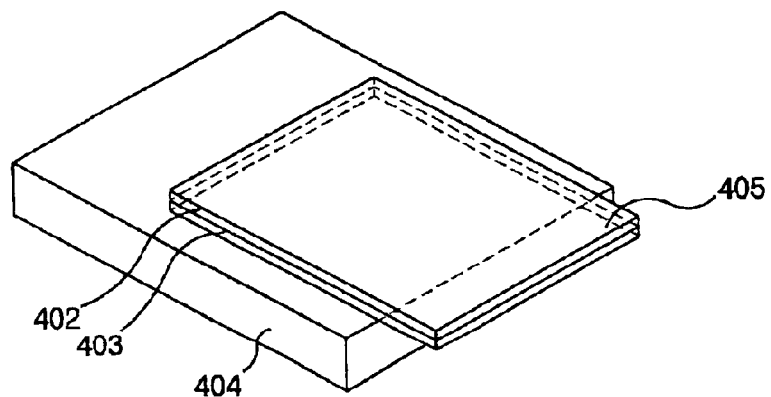
FIGS. 10A to 10F illustrate sequential processes for cutting a liquid crystal display panel in accordance with a third embodiment of the present invention.

First, as shown in FIG. 10A, first and second mother substrates including a plurality of unit panels formed thereon are loaded on a first table 404. And then, the first and second mother substrates 402 and 403 are moved in one direction, so that a dummy region 405 where no unit panel is formed is protruded from one side of the first table 404.

Figure 10B:
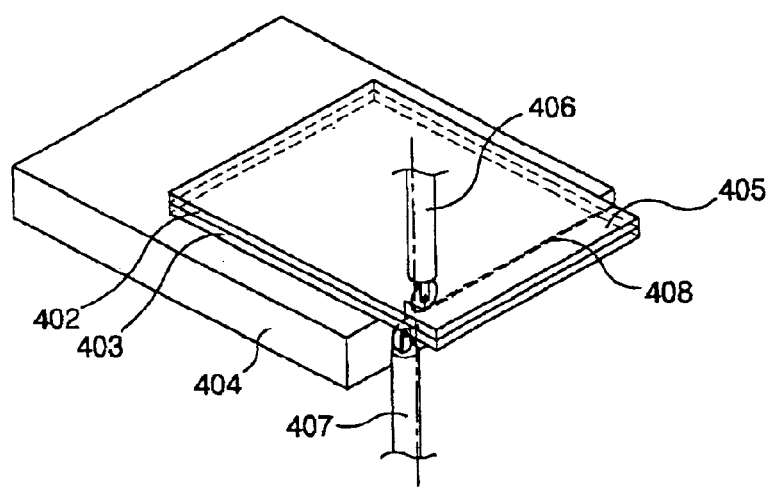

Next, as shown in FIG. 10B, a first scribing line 408 is formed at the surface of the first and second mother substrates protruded from the first table 404 by using first upper wheel 406 and first lower wheel 407.

Figure 10C:
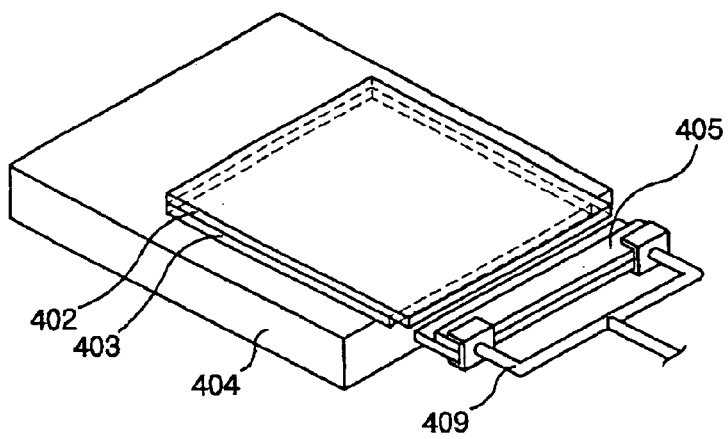

And then, as shown in FIG. 10C, the dummy region 405 with no unit panel formed is removed from the first and second mother substrates 402 and 403 along the first scribing line 408 by using a robot grip 409.

In order to facilitate the removal of the dummy region 405 from the first and second mother substrates 402 and 403 with the robot grip 409, at least one portion of the first scribing line 408 is pressed with a roll, similar to the first embodiment of the present invention, after the first scribing line 408 is formed with the first upper wheel 406 and the first lower wheel 407. Thus, a crack can be transmitted along the first scribing line 408.

Since the liquid crystal display panel differs in size according to the model of a liquid crystal display device, the robot grip 409 may have to be able to control the heights by using a sub motor.

When the first mother substrate 402 with the thin film transistor array substrates formed thereon is stacked on the second mother substrate 403 with the color filter substrates formed thereon, the robot grip 409 is positioned to be lower than the first and second mother substrates 402 and 403, so as to hold the dummy region 405, since the thin film transistor substrate is protruded to be longer than the color filter substrate. Conversely, the robot grip 409 is positioned to be higher than the first and second mother substrates 402 and 403, so as to hold the dummy region 405, so that an impact applied to the unit panel may be prevented in advance.

Figure 10D:
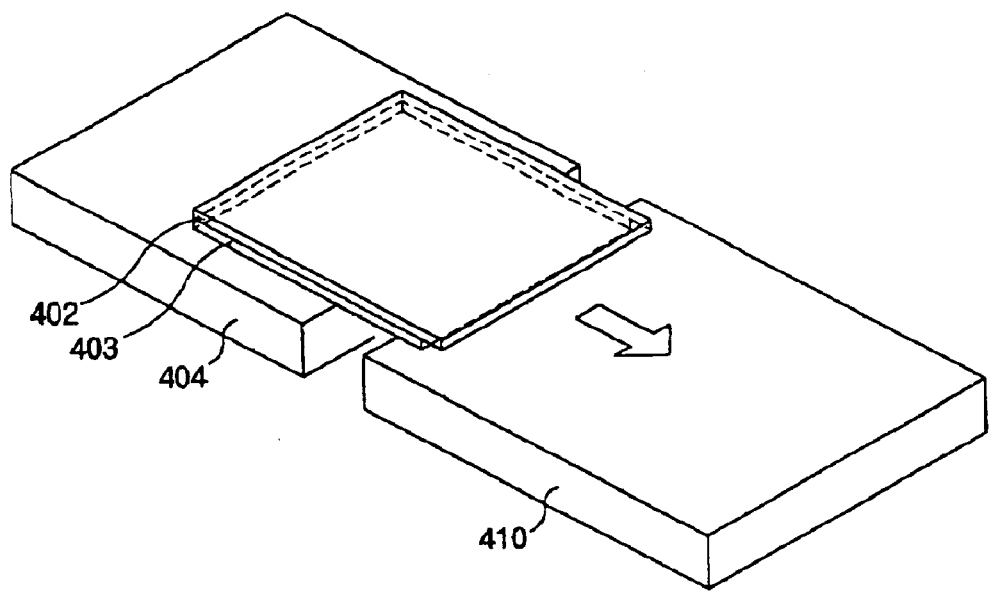

As shown in FIG. 10D, the first and second mother substrates 402 and 403 without the dummy region 405 are moved in one direction to be bridged between the first table 404 and the second table 410 that are spaced apart a certain distance.

Figure 10E:
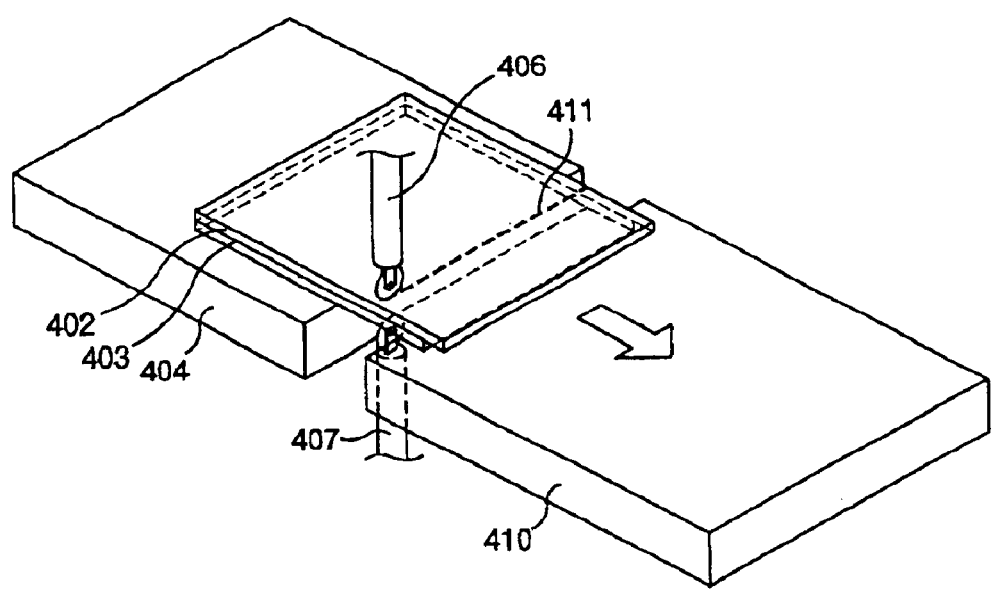

As shown in FIG. 10E, a second scribing line 411 is formed at the surface of the first and second mother substrates 402 and 403 by using the first upper wheel 406 and the first lower wheel 407 located at the space between the first and second tables 404 and 410.

Figure 10F:
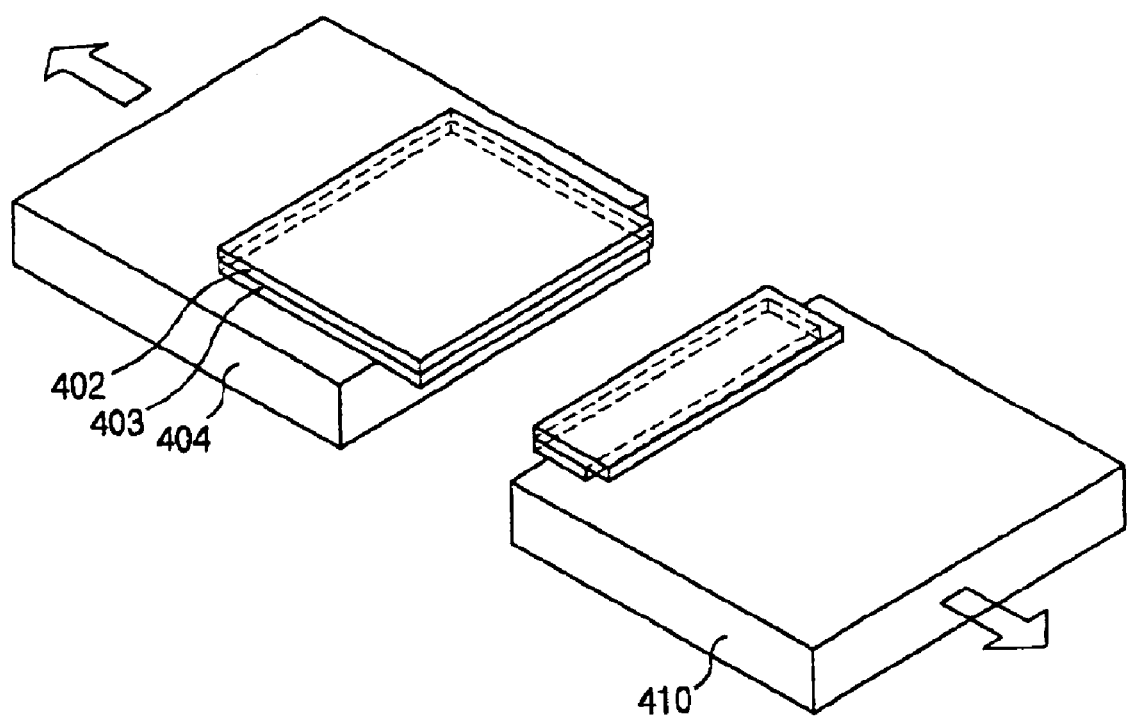

Next, as shown in FIG. 10F, the first and second tables 404 and 410 are moved in a direction that they become distant from each other. The unit panels are cut and separated from the first and second mother substrates 402 and 403 along the second scribing line 411.

In order to easily cut and separate the unit panels from the first and second mother substrates 402 and 403 after moving the first and second tables 404 and 410 in the opposite direction, the second scribing line 411 is formed through the first upper wheel 406 and the first lower wheel 407. Then, at least one portion of the second scribing line 411 is pressed with a roll so that a crack can be transmitted along the second scribing line 411.

As so far described, the device of a liquid crystal display panel and the method for cutting using the same in accordance with the present invention have the following advantages over the conventional art.

For example, referring back to the first embodiment of the present invention, the liquid crystal display panels may be cut into the unit liquid crystal display panels by forming the first and second scribing lines by one rotation process and two simultaneous scribing processes of the first and second mother substrates, and pressing a portion of or along the first and second scribing lines with the first and second rolls.

Thus, the time required for scribing may be minimized compared to that of the conventional art. Also, since an overturning unit for overturning the first and second mother substrates and a breaking unit for a crack transmission are not necessary, the time required for scribing, breaking, and overturning is reduced, thereby improving productivity. In addition, an installation expense and an installation space of equipment are effectively used.

Referring to the second embodiment of the present invention, the liquid crystal display panel may be cut into the unit liquid crystal display panels by forming the first and second scribing lines through one rotation process and two simultaneous scribing processes of the first and second mother substrates and moving the first and second table or the third and fourth tables, on which the first and second mother substrates in the opposite direction.

Thus, the unit panels may be more effectively cut out from the mother substrates. Especially, when the dummy seal pattern is formed to prevent distortion of the first and second mother substrates, the unit panels may be effectively cut out from the mother substrates.

Similarly, referring to the third embodiment of the present invention, in case that the dummy seal pattern is formed at the exterior where no unit panel is formed to prevent distortion of the first and second mother substrates, cutting of the unit panels may be effectively performed.

In addition, the dummy region having a small width may be held and processed without difficulty in the third embodiment of the present invention.

It will be apparent to those skilled in the art that various modifications and variations can be made in the cutter for cutting a liquid crystal display and the method for cutting using the same of the present invention without departing from the spirit or scope of the inventions. Thus, it is intended that the present invention covers the modifications and variations of this invention provided they come within the scope of the appended claims and their equivalents.

What is claimed is:

1. A device for cutting a liquid crystal display panel, comprising:
    a first scribing unit for forming a first set of scribing lines at first and second mother substrates by using first and second wheels and pressing at least a portion of the first set of scribing lines with a first roll;
    a second scribing unit for forming a second set of scribing lines at the first and second mother substrates by using third and fourth wheels and pressing at least a portion of the second set of scribing lines with a second roll; and
    a first rotating unit for rotating the first and second mother substrates to form the second set of scribing lines.

2. The device of claim 1, wherein the first mother substrate including a plurality thin film transistor substrates is stacked on the second mother substrate including a plurality of color filter substrates.

3. The device of claim 1, wherein the first wheel moves to form the first scribing line in a first direction and the first roll moves to press the first scribing line in a second direction.

4. The device of claim 1, wherein the first and second rolls are formed of urethane.

5. The device of claim 1, wherein the first rotating unit rotates the first and second mother substrates by 90°.

6. A device for cutting a liquid crystal display panel comprising:
    a first scribing unit for loading and holding first and second mother substrates between first and second tables, forming a first scribing line on first and second mother substrates with first and second wheels, and cutting the first and second mother substrates by moving the first and second tables;
    a first rotating unit for rotating the first and second mother substrates by 90°; and
    a second scribing unit for loading and holding the first and second mother substrates between third and fourth tables, forming a second scribing line on the first and second mother substrates with the third and fourth wheels to cut the first and second mother substrates by moving the third and fourth tables.

7. The device of claim 6, wherein the first mother substrate including a plurality of thin film transistor substrates is stacked on the second mother substrates including a plurality of color filter substrates.

8. The device of claim 6, wherein at least one of the first to fourth tables has a plurality of vacuum suction holes for holding the substrate.

9. The device of claim 6, wherein at least one of the first to fourth tables has a vacuum suction unit.

10. A method for cutting a liquid crystal display panel, comprising:
    forming a first set of scribing lines at first and second mother substrates;
    pressing at least a portion of the first set of scribing lines with a first roll to cut the first and second mother substrates;
    forming a second set of scribing lines at the first and second mother substrates; and
    pressing at least a portion of the second set of scribing lines with a second roll to cut the first and second mother substrates,
    wherein one of the first and second sets of scribing lines have lines that are at different relative positions on the respective first and second mother substrates.

11. The method of claim 10, wherein the first mother substrate including a plurality of thin film transistor substrates is stacked on the second mother substrate including a plurality of color filter substrates.

12. The device of claim 10, wherein the first and second rolls are formed of urethane.

13. The method of claim 10, wherein further comprising rotating the first and second mother substrates by 90° prior to the second scribing line.

14. A method for cutting a liquid crystal display panel, comprising:

loading and holding first and second mother substrates between first and second tables;

forming a first scribing line at first and second mother substrates;

cutting the first and second mother substrates by moving the first and second tables;

loading and holding the first and second mother substrates between third and fourth tables;

forming a second scribing line at the first and second mother substrates; and cutting the first and second mother substrates by moving the third and fourth tables.

15. The method of claim 14, wherein the first mother substrates including a plurality of thin film transistor substrates is stacked on the second mother substrate including a plurality of color filter substrates.

16. The method of claim 14, further comprising rotating the first and second mother substrates by 90° prior to the loading and holding the first and second mother substrates between third and fourth tables.

17. The method of claim 14, wherein at least one of the first to fourth tables has a plurality of vacuum suction holes for holding the substrates.

18. The method of claim 14, wherein the at least one of the first to fourth tables has a vacuum suction unit.

19. A method for cutting a liquid crystal display panel, comprising:

holding first and second mother substrates to protrude a dummy region of the first and second mother substrates from a first table;

fanning a first scribing line at the protruded first and second mother substrates with first upper and lower wheels;

removing the dummy region from the first and second mother substrates along the first scribing line by using a robot grip;

moving the first and second mother substrates without the dummy region between the first and second tables spaced apart from each other to form a second scribing line at the first and second mother substrates by using the first upper and lower wheels; and moving the first and second tables to cut the first and second mother substrates.

20. The method of claim 19, further comprising pressing at least a portion of one of the first and second scribing lines with a roll.

21. The method of claim 19, further comprising pressing one of the first and second scribing lines along the one of the first and second scribing lines with a roll.

22. The method of claim 20, wherein the roll is formed of urethane.

23. The method of claim 21, wherein the roll is formed of urethane.

24. The method of claim 19, wherein the first mother substrate including a plurality of thin film transistor substrates is stacked on the second mother substrate including a plurality of color filter substrates.

25. The method of claim 19, wherein at least one of the first and fourth tables has a plurality of vacuum suction holes for holding the substrates.

26. The method of claim 19, wherein at least one of the first to fourth tables has a vacuum suction unit.

* * * * *